(12) United States Patent
Callegari et al.

(10) Patent No.: US 8,951,438 B2
(45) Date of Patent: *Feb. 10, 2015

(54) SIMPLIFIED CONTROL OF COLOR SHIFTING PROPERTIES OF A CHIRAL LIQUID CRYSTAL POLYMER

(75) Inventors: Andrea Callegari, Chavannes-pres-Renens (CH); Tristan Jauzein, Lausanne (CH)

(73) Assignee: Sicpa Hòlding SA, Prilly (CH)

( * ) Notice: Subject to any disclaimer, the term of this patent is extended or adjusted under 35 U.S.C. 154(b) by 261 days.

This patent is subject to a terminal disclaimer.

(21) Appl. No.: 13/313,242

(22) Filed: Dec. 7, 2011

(65) Prior Publication Data

US 2012/0141745 A1 Jun. 7, 2012

Related U.S. Application Data

(60) Provisional application No. 61/420,582, filed on Dec. 7, 2010.

(30) Foreign Application Priority Data

Dec. 7, 2010 (WO) .................. PCT/EP2010/069051

(51) Int. Cl.
| | |
|---|---|
| *C09K 19/54* | (2006.01) |
| *C09K 19/58* | (2006.01) |
| *C09K 19/52* | (2006.01) |
| *C09K 19/04* | (2006.01) |

(52) U.S. Cl.
CPC ............... *C09K 19/54* (2013.01); *C09K 19/588* (2013.01); *C09K 2019/0448* (2013.01)
USPC .................. 252/299.2; 252/299.01; 252/299.5

(58) Field of Classification Search
CPC ............... C09K 19/586; C09K 19/588; C09K 2019/0448; C09K 2219/03; C09K 19/54; B42D 233/26; B42D 2035/34
USPC ............. 428/195.1; 252/299.01, 299.2, 299.5
See application file for complete search history.

(56) References Cited

U.S. PATENT DOCUMENTS

| | | | |
|---|---|---|---|
| 4,340,624 | A | 7/1982 | Yamashita et al. |
| 5,678,863 | A | 10/1997 | Knight et al. |

(Continued)

FOREIGN PATENT DOCUMENTS

| | | |
|---|---|---|
| CN | 1715309 | 1/2006 |
| CN | 101415797 | 4/2009 |

(Continued)

OTHER PUBLICATIONS

U.S. Appl. No. 13/313,238 to Andrea Callegari et al., filed Dec. 7, 2011.

(Continued)

*Primary Examiner* — Shean C Wu
(74) *Attorney, Agent, or Firm* — Greenblum & Bernstein, P.L.C.

(57) ABSTRACT

A chiral liquid crystal precursor composition which comprises at least one salt that changes a position of the selective reflection band exhibited by the composition in a cured state compared to the position of a selective reflection band exhibited by a composition in the cured state that does not contain the at least one salt. This abstract is neither intended to define the invention disclosed in this specification nor intended to limit the scope of the invention in any way.

44 Claims, 2 Drawing Sheets

(56) References Cited

U.S. PATENT DOCUMENTS

| | | | |
|---|---|---|---|
| 6,096,392 A | 8/2000 | Nishio | |
| 6,207,240 B1 | 3/2001 | Schoenfeld et al. | |
| 6,589,445 B2 | 7/2003 | Sugiyama et al. | |
| 6,733,689 B1 | 5/2004 | Meyer et al. | |
| 7,416,764 B2 | 8/2008 | Matsumoto et al. | |
| 7,742,136 B2 | 6/2010 | Umemoto et al. | |
| 7,879,256 B2 | 2/2011 | Goldfinger et al. | |
| 8,344,175 B2 | 1/2013 | Goldfinger et al. | |
| 8,632,849 B2 | 1/2014 | Xu et al. | |
| 2002/0033479 A1 | 3/2002 | Sugiyama et al. | |
| 2003/0122105 A1 | 7/2003 | Ichihashi | |
| 2006/0166099 A1* | 7/2006 | Okabe et al. | 429/232 |
| 2006/0257633 A1 | 11/2006 | Inoue et al. | |
| 2007/0166479 A1 | 7/2007 | Drake et al. | |
| 2007/0224341 A1 | 9/2007 | Kuntz et al. | |
| 2007/0228326 A1 | 10/2007 | Goldfinger et al. | |
| 2010/0025641 A1 | 2/2010 | Jimbo et al. | |
| 2010/0103335 A1 | 4/2010 | Bastiaansen et al. | |
| 2011/0101088 A1* | 5/2011 | Marguerettaz et al. | 235/375 |
| 2011/0114885 A1 | 5/2011 | Goldfinger et al. | |
| 2012/0061470 A1 | 3/2012 | Marguerettaz et al. | |
| 2013/0069003 A1 | 3/2013 | Marguerettaz et al. | |

FOREIGN PATENT DOCUMENTS

| | | |
|---|---|---|
| CN | 101417564 | 4/2009 |
| CN | 101825807 | 9/2010 |
| EP | 0216712 | 4/1987 |
| EP | 0847432 | 6/1998 |
| EP | 0890628 | 1/1999 |
| EP | 0967084 | 12/1999 |
| EP | 1681586 | 7/2006 |
| EP | 1381520 | 8/2006 |
| EP | 1710021 | 10/2006 |
| GB | 2457911 | 9/2009 |
| JP | 2009-300662 | 12/2009 |
| WO | 93/22397 | 11/1993 |
| WO | 95/22586 | 8/1995 |
| WO | 03/041875 | 5/2003 |
| WO | 2005/033189 | 4/2005 |
| WO | 2008/110316 | 9/2008 |
| WO | 2009/121605 | 10/2009 |
| WO | 2010/115879 | 10/2010 |

OTHER PUBLICATIONS

J.L. Fergason, Molecular Crystals, vol. 1, pp. 293-307 (1966).
BASF, Paliocolor LC 242 and LC 756, Tehnical Information Sep. 2002, 5 pages.
International Search Report and Written Opinion in PCT/EP2010/069051 dated Aug. 31, 2011.
International Search Report and Written Opinion in PCT/EP2010/069038 dated Sep. 26, 2011.
Chinese Office Action with partial English Translation in regards to Chinese Application No. 201180058605.0, dated Mar. 5, 2014.
New Zealand Office Action in regards to New Zealand Application No. 609946, dated Mar. 13, 2014.
Chinese Office Action with partial English Translation in regards to Chinese Application No. 201180058599.9, dated Feb. 28, 2014.

* cited by examiner

SIMPLIFIED CONTROL OF COLOR SHIFTING PROPERTIES OF A CHIRAL LIQUID CRYSTAL POLYMER

CROSS-REFERENCE TO RELATED APPLICATIONS

The present application claims the benefit under 35 U.S.C. §119(e) of U.S. Provisional Application No. 61/420,582, filed Dec. 7, 2010 and claims priority under 35 U.S.C. §119 of International Patent Application No. PCT/EP2010/069051, filed Dec. 7, 2010. The entire disclosures of these applications are expressly incorporated by reference herein.

BACKGROUND OF THE INVENTION

1. Field of the Invention

The present invention relates to a simplified process for controlling the color-shifting properties of chiral nematic (also called cholesteric) liquid crystal polymers. In particular, the invention relates to controlling the color-shifting properties of a chiral liquid crystal polymer by incorporating therein one or more salts which are capable of changing the position of the selective reflection band (color) of the polymer. Correspondingly modified chiral liquid crystal polymers are useful, for example, for marking purposes.

2. Discussion of Background Information

Counterfeit is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks.

More recently, a security feature has emerged and is used to authenticate a genuine product such as a drug and to avoid counterfeiting. This technology is based on optically variable inks. Its principle is based on the difference in observable color of a marking made with an optically variable ink when a packaging, security document, etc. carrying the marking is viewed from different angles ("viewing-angle dependent color").

Optically variable inks provide first-line recognizability not only by a person, but also facilitate machine-readability. Many patents describe this security product, its composition and its application. One example of the many types of optically variable inks is the class of compounds called cholesteric liquid crystals. When illuminated with white light, the cholesteric liquid crystal structure reflects light of a certain color which depends on the material in question and generally varies with the viewing angle and the temperature. The cholesteric material itself is colorless and the observed color is the result of a physical reflection effect at the cholesteric helical structure that is adopted by the liquid crystal precursor composition at a given temperature. See, e.g., J. L. Fergason, Molecular Crystals, Vol. 1, pp. 293-307 (1966), the entire disclosure of which is incorporated by reference herein.

EP-A-1 381 520 and EP-A-1 681 586, the entire disclosures of which are incorporated by reference herein, disclose a birefringent marking and a method of applying the same in the form of a liquid crystal layer having a non-uniform pattern of regions of different thickness. The applied liquid crystal coating or layer may provide for a hidden image on a reflected substrate, which image is invisible when viewed under non-polarized light but is rendered visible under polarized light or with the help of a polarization filter.

U.S. Pat. No. 5,678,863, the entire disclosure of which is incorporated by reference herein, discloses means for the identification of documents of value which include a paper or polymer region, said region having a transparent and translucent characteristic. A liquid crystal material is applied to the region to produce an optical effect which differs when viewed in transmitted and reflected light. The liquid crystal material is in liquid form at room temperature and must be enclosed in a containing means such as microcapsules in order to be suitable for use in a printing process such as gravure, roller, spray or ink jet printing.

The ordered liquid crystalline state depends upon the presence of a chiral dopant. Nematic liquid crystals without chiral dopant show a molecular arrangement that is characterized by its birefringence. Nematic polymers are known from, e.g., EP-A-0 216 712, EP-A-0 847 432, and U.S. Pat. No. 6,589,445, the entire disclosures of which are incorporated by reference herein.

As mentioned above, the liquid crystal based security feature provides first-line recognizability by the consumer and also by retailers and producers of goods and articles. Like for many other security features which are used in the market, there is always the temptation for counterfeiters to reproduce these security features and therefore misleads consumers and retailers. In view of the foregoing facts, there continues to be a need to improve the security of liquid crystal polymer materials based on liquid crystal precursors. The ability of manufacturing security features with tight quality standards is an important deterrent against counterfeiting, as it demands a significant effort on the part of the counterfeiter to produce a fake of comparable quality. In the case of chiral liquid crystal polymers it is then highly desirable to obtain as exactly as possible the specified color-shifting properties, routinely and reliably.

The color-shifting properties of a chiral liquid crystal polymer are closely connected to its composition and in particular, to the ratio of nematic and chiral dopant molecules present in the polymer. It is difficult to obtain a specific and controlled color shift to a predetermined wavelength, as a number of parameters (temperature, nature of substrate, etc.) affect the color shift obtained upon applying a chiral liquid crystal precursor composition onto a substrate. An existing system sold under the name Paliocolor© by BASF uses the concentration of the chiral dopant in the mixture of nematic compound and chiral dopant to obtain the desired reflection wavelength. In the field of security marking and/or coding, the marking or coding is often part of the production line process, for example, to protect packaging, articles and goods, banknotes, security documents, etc. Very often, during the production line process, it is necessary to modify the initial composition, in order to control the properties of the resulting marking and/or coding (in particular, the position of the selective reflection band). Once the mixture is prepared, one can make a correction to shorter wavelengths, by adding the appropriate quantity of chiral dopant. On the contrary, making a correction to longer wavelengths is impractical, as it requires adding a substantial amount of nematic compound. Thus, the fine-tuning of the composition leading to a specific and desired reflection wavelength is a delicate step, often resulting in an important waste of time and/or material.

In view of the forgoing facts, using a chiral liquid crystal precursor composition in a production line (processes for making items such as passports, packaging, etc.) in order to mark packaging with, e.g., a data matrix and/or generating codes within a short period of time often creates several problems. Typical problem that may be encountered is for example, obtaining in a reproducible manner the desired optical properties of the chiral liquid crystal polymer, and therefore it is desirable to have available means to adjust these optical properties. It is also problematic during the production line processes to apply with a printing station several different colors on packaging by adding the chiral dopant to an existing composition in a controlled manner. Therefore there is a need to find alternative and efficient solutions in a production line (processes for making items such as passports, packaging, etc.) for quickly obtaining a modification (or a single stable color) of color-shifting properties of a chiral liquid crystal precursor composition without encountering the problems set forth above.

UMMARY OF THE INVENTION

It has surprisingly been found that the incorporation of a relatively inexpensive class of substances into a chiral liquid crystal polymer precursor composition influences the color-shifting properties of the composition in an efficient and predictable manner and thereby eliminates the need of having to modify the ratio of nematic compound(s) and chiral dopant in the composition. This leads to modifiable optical properties of a liquid crystal polymer film under the action of only one external parameter and is compatible with an efficient production line process.

The present invention provides a chiral liquid crystal precursor composition which comprises at least one salt that changes (usually in a concentration-dependent manner) a position of a selective reflection band exhibited by the composition in the cured (chiral liquid crystal) state compared to a position of a selective reflection band exhibited by the composition in the cured (chiral liquid crystal) state when it does not contain the at least one salt.

In one aspect, the chiral liquid crystal precursor composition may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

In another aspect of the chiral liquid crystal precursor composition of the present invention, the precursor composition may comprise at least one chiral dopant compound B of formula (I):

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (I) to (iii):

$$-[(CH_2)_y-O]_z-C(O)-CH=CH_2; \quad (i)$$

$$-C(O)-D_1-O-[(CH_2)_y-O]_z-C(O)-CH=CH_2; \quad (ii)$$

$$-C(O)-D_2-O-[(CH_2)_y-O]_z-C(O)-CH=CH_2; \quad (iii)$$

$D_1$ denotes a group of formula $D_2$ denotes a group of formula m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In yet another aspect of the precursor composition of the present invention the at least one salt (e.g., one, two, three or more different salts) that changes the position of the selective reflection band exhibited by the cured chiral liquid crystal precursor composition may be selected from metal salts and (preferably quaternary) ammonium salts. For example, the at least one salt may comprise at least one salt of a metal such as an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

In another aspect, the at least one salt may shift the position of the selective reflection band exhibited by the cured chiral liquid crystal precursor composition by at least about 5 nm, e.g., by at least about 10 nm, by at least about 20 nm, by at least about 30 nm, by at least about 40 nm, or by at least about 50 nm, and/or the at least one salt may shift the position of the selective reflection band to shorter wavelengths or may shift the position of the selective reflection band to longer wavelengths and/or the shifted position of the selective reflection band may be in the visible range and/or the shifted position of the selective reflection band may be in the invisible range. In this regard, it is noted that "shifting the position of the selective reflection band" as used herein and in the appended claims means shifting $\lambda_{max}$ as measured using an analytical spectral device that measures the reflectance of a sample in the infrared-near-infrared-visible-UV range of the spectrum, such as the LabSpec Pro device made by Analytical Spectral Devices Inc. of Boulder, Colo.

In yet another aspect of the precursor composition of the present invention, the at least one salt may be present in the precursor composition in a concentration of at least about 0.01%, e.g., at least about 0.05%, at least about 0.1%, or at least about 0.5% by weight, based on the solids content (i.e., without volatile components such as solvents) of the precursor composition. In another aspect, the at least one salt may be present in a concentration of not higher than about 10%, e.g., not higher than about 5%, or not higher than about 2% by weight, based on the solids content of the precursor composition.

In another aspect of the precursor composition of the present invention, the composition may further comprise one or more polymerization initiators, for example, one or more UV polymerization initiators.

In yet another aspect, the precursor composition may be present in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

The present invention further provides the precursor composition of the present invention as set forth above (including the various aspects thereof) in a cured (chiral liquid crystal) state.

The present invention further provides a substrate which comprises at least one precursor composition of the present invention as set forth above (including the various aspects thereof), either in an uncured state or in a cured (chiral liquid crystal) state.

In one aspect of the substrate of the present invention, the substrate may be or comprise at least one of a label, packaging, a cartridge, a container, a closed cartridge (e.g., a capsule) that contains pharmaceuticals, neutraceuticals, foodstuffs or a beverage (such as, e.g., coffee, tea, milk, chocolate, etc.), a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good. The substrate may further be a film or sheet of polyethylene terephthalate (PET) or polyolefin such as polyethylene, for example as a temporary support from which the cured precursor composition (e.g., in the form of a marking) can be transferred to a permanent substrate (e.g., one of the substrates set forth in the preceding sentence).

The present invention further provides a method of changing the position of a selective reflection band exhibited by a chiral liquid crystal precursor composition in the cured (chiral liquid crystal) state. The method comprises incorporating in the precursor composition at least one salt that is capable of changing the position of the selective reflection band exhibited by the precursor composition in a cured (chiral liquid crystal) state.

The present invention further provides a method of shifting a selective reflection band exhibited by a chiral liquid crystal precursor composition in the cured chiral liquid crystal state to a predetermined position. The method comprises incorporating in the precursor composition at least one salt in an amount that results in a shift of the selective reflection band to the predetermined position.

In one aspect, the method may further comprise a determination (e.g., recording) of the shift of the position of the selective reflection band as a function of the amount (concentration) of the least one salt that is present in the precursor composition (e.g., by plotting the shift of the position of the selective reflection band against the amount of salt) and the selection of the amount of the at least one salt that results in the shift of the selective reflection band of the cured precursor composition to the (desired) predetermined position.

In another aspect of the method, the position of the selective reflection band may be shifted to a predetermined wavelength.

The present invention further provides a method of providing a marking on a substrate. The method comprises (a) the application of at least one chiral liquid crystal precursor composition of the present invention as set forth above (including the various aspects thereof) onto a surface of a substrate (one or more areas). The method further comprises (b) the heating of the applied chiral liquid crystal precursor composition to bring same to a chiral liquid crystal state; and (c) the curing of the composition in the chiral liquid crystal state (e.g., by radiation, such as UV-radiation).

In one aspect of the method of the present invention, the chiral liquid crystal precursor composition may be heated to a temperature of from about 55° C. to about 150° C. to bring the chiral liquid crystal precursor composition to a chiral liquid crystal state.

In another aspect of the method, the liquid crystal precursor composition may be applied onto the surface of the substrate by at least one of spray coating, knife coating, roller coating, screen coating, curtain coating, gravure printing, flexography, screen-printing, pad printing, and ink-jet printing (for example continuous ink jet printing, drop-on-demand ink-jet printing, valve jet printing), and/or may be applied in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

In a still further aspect, the substrate may be or may comprise at least one of a label, packaging, a cartridge, a container, a closed cartridge (e.g., a capsule) that contains pharmaceuticals, nutraceuticals, foodstuffs or a beverage (such as, e.g., coffee, tea, milk, chocolate, etc.), a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

In another aspect of the method, at least two different precursor compositions (e.g., 2, 3, 4 or more different compositions) may be applied (either separately or simultaneously) onto the substrate and may be processed according to (b) and (c) either together or separately. For example, the precursor compositions may differ with respect to the at least one salt comprised therein and/or they may differ with respect to the concentration of the at least one salt (same salt) comprised therein.

In yet another aspect of the method, the chiral liquid crystal precursor composition may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH—C(O)—$.

In another aspect of the method of the present invention, the chiral liquid crystal precursor composition may comprise at least one chiral dopant compound B of formula (I):

(I)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):

$D_1$ denotes a group of formula $D_2$ denotes a group of formula m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In yet another aspect of the method of the present invention, the at least one salt (e.g., one, two, three or more different salts) that changes the position of the selective reflection band exhibited by the cured chiral liquid crystal precursor composition may be selected from metal salts and (preferably quaternary) ammonium salts. For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

In one aspect, the one or more salts may comprise a metal such as, e.g., an alkali metal and/or an alkaline earth metal. For example, the metal may be selected from one or more of Li and Na.

The present invention further provides a substrate that is provided with a marking, wherein the substrate is obtainable by the method of the present invention as set forth above (including the various aspects thereof). The present invention further provides a substrate which comprises at least two (e.g., 2, 3, or 4) different precursor compositions according to the present invention as set forth above (including the various aspects thereof), which precursor compositions differ with respect to (i) the concentration of the at least one salt and/or (ii) the identity of the at least one salt. The present invention further provides the use of at least one salt for changing the position of a selective reflection band exhibited by a chiral liquid crystal precursor composition in a cured state compared to the position of a selective reflection band exhibited by a composition in the cured state that does not contain the at least one salt.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate for use in the present invention is not particularly limited and can be of various types. The substrate may, for example, consist (essentially) of or comprise one or more of a metal (for example, in the form of a container such as a can or a capsule for holding various items such as, e.g., nutraceuticals, pharmaceuticals, beverages or foodstuffs (e.g. chocolate, coffee, milk or mixtures thereof)), a fabric, a coating, and equivalents thereof, glass (for example, in the form of a container such as a bottle for holding various items such as, e.g., nutraceuticals, pharmaceuticals, beverages or foodstuffs (e.g. chocolate, coffee, milk or mixtures thereof)), cardboard (e.g., in the form of packaging), paper, and a polymeric material such as, e.g., PET or polyethylene (e.g., in the form of a container or as a part of a security document). It is pointed out that these substrate materials are given exclusively for exemplifying purposes, without restricting the scope of the invention. In general, any substrate (which may not necessarily be flat and may be uneven) whose surface is not soluble, or only slightly soluble, in solvent(s) used in the chiral liquid polymer precursor composition is a suitable substrate for the purposes of the present invention.

The substrate may advantageously have a dark or black surface or background onto which the precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can always be identified with the help of a circular polarization filter because it selectively reflects only one of the two possible circular polarized light components, in accordance with its chiral helical structure. The substrate according to the present invention may further comprise additional security elements, such as organic and/or inorganic pigments, dyes, flakes, optically variable elements, magnetic pigments, etc.

The chiral liquid crystal precursor composition according to the present invention preferably comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about four to about fifty times the (total) concentration of the one or more cholesteric compounds B. Often, a chiral liquid crystal precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

The one or more cholesteric (i.e., chiral dopant) compounds B for use in the present invention preferably comprise at least one polymerizable group.

As set forth above, suitable examples of the one or more chiral dopant compounds B include those of formula (I):

(I)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (I) to (iii):

(i)

(ii)

(iii)

$D_1$ denotes a group of formula $D_2$ denotes a group of formula m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one aspect, the one or more chiral dopant compounds B may comprise one or more isomannide derivatives of formula (IA):

(IA)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (I) to (iii):

—[(CH$_2$)$_y$-O]$_z$-C(O)—CH=CH$_2$;      (i)

—C(O)-D$_1$-O—[(CH$_2$)$_y$-O]$_z$-C(O)—CH=CH$_2$;      (ii)

—C(O)-D$_2$-O—[(CH$_2$)$_y$-O]$_z$-C(O)—CH=CH$_2$;      (iii)

$D_1$ denotes a group of formula $D_2$ denotes a group of formula m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another aspect, the one or more chiral dopant compounds B may comprise one or more isosorbide derivatives represented by formula (IB):

(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (I) to (iii):

—[(CH$_2$)$_y$-O]$_z$-C(O)—CH=CH$_2$;      (i)

—C(O)-D$_1$-O—[(CH$_2$)$_y$-O]$_z$-C(O)—CH=CH$_2$;      (ii)

—C(O)-D$_2$-O—[(CH$_2$)$_y$-O]$_z$-C(O)—CH=CH$_2$;      (iii)

$D_1$ denotes a group of formula $D_2$ denotes a group of formula m, n, o, p, q, r, s, and t each independently denote 0, 1, or 2; y denotes 0, 1, 2, 3, 4, 5, or 6; z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-$D_1$-O—[(CH$_2$)$_y$—O]$_z$—C(O)—CH=CH$_2$ and/or of formula —C(O)-$D_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula —C(O)-$D_1$-O—[(CH$_2$)$_y$—O]$_z$—C(O)—CH=CH$_2$ and/or a group of formula —C(O)-$D_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-2-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention are provided in the Examples below.

The one or more chiral dopant compounds B will usually be present in a total concentration of from about 0.1% to about 30% by weight, e.g., from about 0.1% to about 25%, or from about 0.1% to about 20% by weight, based on the total weight of the composition. For example, in the case of inkjet printing the best results will often be obtained with concentrations of from 3% to 10% by weight, e.g., from 5% to 8% by weight, based on the total weight of the polymer composition. The one or more nematic compounds A will often be present in a concentration of from about 30% to about 50% by weight, based on the total weight of the polymer composition.

One component of the chiral liquid crystal precursor composition for use in the present invention is a salt and in particular, a salt that is capable of changing the position of the selective reflection band exhibited by the cured chiral liquid crystal precursor composition (in the chiral liquid crystal state) compared to the position of the selective reflection band exhibited by the cured composition without the salt. Regarding the selective reflection band exhibited by a chiral liquid crystal the explanations in U.S. Pat. No. 7,742,136 or US 20100025641, the entire disclosure of which is expressly incorporated by reference herein, may, for example, be referred to.

The extent to which the position of the selective reflection band exhibited by a given cured chiral liquid crystal precursor composition can be shifted by the presence of a salt depends on various factors such as, inter alia, the cation of the salt, the anion of the salt, and the concentration of the salt. In this regard, the Examples below may be referred to. Usually it is preferred for a salt to be present in a given chiral liquid crystal precursor at a concentration which shifts the position of the selective reflection band exhibited by a cured chiral liquid crystal precursor composition by at least about 5 nm, e.g., by at least about 10 nm, by at least about 20 nm, at least about 30 nm, at least about 40 nm, or by at least about 50 nm. Suitable (total) salt concentrations are often within the range of from about 0.01% to about 10% by weight, e.g., from about 0.1% to about 5% by weight, based on the solids content of the chiral liquid crystal precursor composition.

Non-limiting examples of suitable salts include salts which comprise a metal cation (main group metals, transition metals, lanthanides and actinides). For example, the metal may be an alkali or alkaline earth metal such as, e.g., Li and Na. Further non-limiting examples of suitable salts include quaternary ammonium salts such as tetraalkylammonium salts. Examples of suitable anions include "regular" ions such as, e.g., halide (e.g., fluoride, chloride, bromide, iodide), perchlorate, nitrate, nitrite, sulfate, sulfonate, sulfite, carbonate, bicarbonate, cyanide, cyanate, and thiocyanate, as well as complex ions such as, e.g., tetrafluoroborate. Of course, mixtures of two or more salts (e.g., two, three, four or more salts) may be used as well. If two or more salts are present, they may or may not comprise the same cation and/or the same anion.

It also is to be appreciated that the present invention is not limited to the visible range of the electromagnetic spectrum. For example, a salt may shift all or a part of the selective reflection band exhibited by a cured chiral liquid crystal precursor composition from the visible range to the IR range, or from the UV range to the visible range, or from the UV range to the IR range.

The chiral liquid crystal precursor composition can be applied to the surface of the substrate by any suitable method such as, for example, spray coating, knife coating, roller coating, screen coating, curtain coating, gravure printing, flexography, offset printing, dry offset printing, letterpress printing, screen-printing, pad printing, and ink-jet printing (for example continuous ink-jet printing, drop-on-demand ink-jet printing, valve jet printing). In one of the preferred embodiments of the invention flexography printing is employed for applying the chiral liquid crystal precursor composition. In another preferred embodiment of the invention, ink-jet printing techniques are used for applying the chiral liquid crystal precursor composition. The industrial ink-jet printers, commonly used for numbering, coding and marking applications on conditioning lines and printing presses, are particularly suitable. Preferred ink-jet printers include single nozzle continuous ink-jet printers (also called raster or multi level deflected printers) and drop-on-demand ink-jet printers, in particular valve-jet printers. The thickness of the applied liquid crystal polymer composition, after curing, according to the above described application techniques, will usually be at least about 1 µm, e.g., at least about 3 µm, or at least about 4 µM, and will usually be not more than about 20 µm, e.g., not more than about 15 µm, not more than about 10 µm, or not more than about 6 µm.

In particular if a chiral liquid crystal precursor composition of the present invention is to be applied by the printing techniques set forth above, the composition will usually comprise a solvent to adjust its viscosity to a value which is suitable for the employed application (printing) technique. Typical viscosity values for flexographic printing inks are in the range of from about 40 seconds to about 120 seconds using e.g. a cup DIN number 4. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, and mixtures of two or more thereof.

Further, in particular if a chiral liquid crystal precursor composition for use in the present invention is to be applied by (continuous) ink-jet printing, the composition will usually also comprise at least one conductivity agent known to those of skill in the art.

If the chiral liquid crystal precursor composition of the present invention (comprising one or more polymerizable monomers) is to be cured/polymerized by UV radiation the composition will also comprise at least one photoinitiator. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a chiral liquid crystal precursor composition of the present invention is to be cured by a method which is different from irradiation with UV light such as, e.g., by means of high-energy particles (e.g., electron beams), X-rays, gamma-rays, etc. the use of a photoinitiator can, of course, be dispensed with.

A chiral liquid crystal precursor composition of the present invention may also comprise a variety of other optional components which are suitable and/or desirable for achieving a particular desired property of the composition and in general, may comprise any components/substances which do not adversely affect a required property of the composition to any significant extent. Non-limiting examples of such optional components are resins, silane compounds, adhesion promoters, sensitizers for the photoinitiators (if present), etc. For example, a chiral liquid crystal precursor composition for use in the present invention may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy)silane, 3-methacryloxypropyl-trimethoxysilane, octyltriethoxysilane, and 3-glycidyloxypropyl triethoxysilane from the Dynasylan® family supplied by Evonik.

The concentration of the one or more silane compounds, if present, in the chiral liquid crystal precursor composition will usually be from about 0.5% to about 5% by weight, based on the total weight of the composition.

In order to strengthen the security of a marking or layer made from a chiral liquid crystal precursor composition according to the present invention the composition may further comprise one or more pigments and/or dyes which absorb in the visible or invisible region of the electromagnetic spectrum and/or one or more pigments and/or dyes which are luminescent and/or one or more magnetic pigments. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. Non-limiting examples of suitable magnetic pigments include particles of transitional metal oxides such as iron and chromium oxides. The presence of pigment(s) and/or dye(s) will enhance and reinforce the security of the marking against counterfeiting.

Following the application (e.g., deposition) of a chiral liquid crystal precursor composition according to the present invention onto a substrate the composition is brought to a chiral liquid crystal state having specific optical properties. The term "specific optical properties" is to be understood as a liquid crystal state with a specific pitch that reflects a specific wavelength range (selective reflection band). To that end the chiral liquid crystal precursor composition is heated, the solvent contained in the composition, if present, is evaporated and the promotion of the desired chiral liquid crystal state takes place. The temperature used to evaporate the solvent and to promote the formation of the liquid crystal state depends on the components of the chiral liquid crystal precursor composition and will in many cases range from about 55° C. to about 150° C., e.g., from about 55° C. to about 100° C., preferably from about 60° C. to about 100° C. Examples of suitable heating sources include conventional heating means such as a hot plate, an oven, a stream of hot air and in particular, radiation sources such as, e.g., an IR lamp. The required heating time depends on several factors such as, e.g., the components of the polymer composition, the type of heating device and the intensity of the heating (energy output of the heating device). In many cases a heating time of from about 0.1 s, about 0.5 s, or about 1 second to about 30 seconds such as, e.g., not more than about 20 seconds, not more than about 10 seconds, or not more than about 5 seconds will be sufficient.

A marking according to the present invention is finally obtained by curing and/or polymerizing the (entire) composition in the chiral liquid crystal state. The fixing or hardening will often be performed by irradiation with UV-light, which induces polymerization of the polymerizable groups present in the precursor composition.

Accordingly, an entire process for making a marking of the present invention may comprise the following steps:

Applying a (salt-containing) chiral liquid crystal precursor composition of the present invention onto the surface of a substrate (or a portion thereof);

Heating the applied precursor composition to bring it to the cholesteric state;

Curing the heated liquid crystal precursor composition to obtain a marking according to the present invention.

A marking made according to the present invention can be incorporated, for example, in a security feature, an authenticity feature, an identification feature or a tracking and tracing feature.

The following examples are intended to illustrate the invention without restricting it.

EXAMPLES

Preparation of a Chiral Liquid Crystal Precursor Composition

A chiral liquid crystal precursor composition (I) was prepared as follows, the indicated percentages being by weight based on the total weight of the composition:

A chiral dopant compound B of formula (I) shown above (4.75%), a nematic compound A1 (14%), a nematic compound A2 (14%), and cyclohexanone (66.45%) were placed into a flask which was thereafter heated until a solution was obtained. To the solution were added 2-methyl-1[4-(methylthio)phenyl]-2-morpholinopropan-1-one (Irgacure 907® from Ciba, photoinitiator, 0.6%) and isopropylthioxanthone (photoinitiator, 0.2%). The final mixture was stirred until complete dissolution was achieved to result in the chiral liquid crystal precursor composition (I).

Preparation of a Layer of a Cured Chiral Liquid Crystal Precursor Composition

The above composition (I) was coated on a substrate (transparent PET film, thickness 125 μm) and the resultant layer was heated to about 80° C. for about 30 seconds to evaporate the solvent and to develop a cholesteric liquid crystal phase, i.e., a state that shows a specific reflection band whose position depends on the concentration of the chiral dopant compound B in the composition. Thereafter the composition was cured by irradiation with a UV lamp (mercury low-pressure lamp having a UV irradiance of 10 mW/cm²) for about 1 second to freeze the cholesteric liquid crystal phase through co-polymerization of the polymerizable groups of compounds A1, A2 and B. After the curing the composition was substantially free of solvent (only trace amounts of cyclohexanone were present) and comprised the above components (in polymerized form) in the following weight percentages, based on the total weight of the composition:

| 41.725% | Compound A1 (nematic precursor) |
| 41.725% | Compound A2 (nematic precursor) |
| 14.16% | Compound B (chiral dopant) |
| 2.39% | Photoinitiator |

Figure 1:
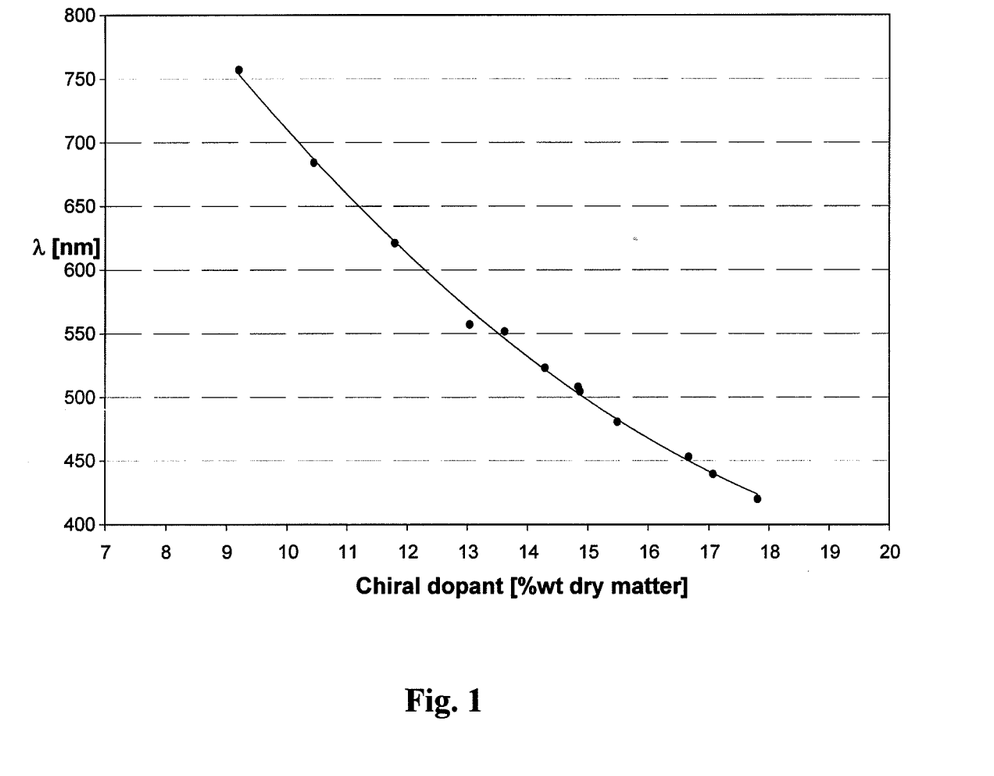
FIG. 1 is a diagram showing the position of the selective reflection band ($\lambda_{max}$) of a cured chiral liquid crystal precursor composition suitable for use in the present invention as a function of the concentration of the chiral dopant contained therein, based on dry matter.

The concentration of chiral dopant compound B in the cholesteric liquid crystal precursor allows to control the position of the selective reflection band and as a result thereof, the color of the cured chiral liquid crystal precursor layer. This is illustrated by FIG. 1 which is a plot of the wavelength of the maximum normal reflection as a function of the concentration of the chiral dopant compound B in the dry composition. With 14.16% of chiral dopant compound B the wavelength of the maximum normal reflection of the composition is around 510 nm, which affords a greenish blue color of the corresponding layer. As shown in FIG. 1, increasing (decreasing) the concentration of chiral dopant compound B in the composition results in a decrease (increase) of the wavelength of the maximum normal reflection.

Addition of Salt to the Chiral Liquid Crystal Precursor Composition

Figure 2:
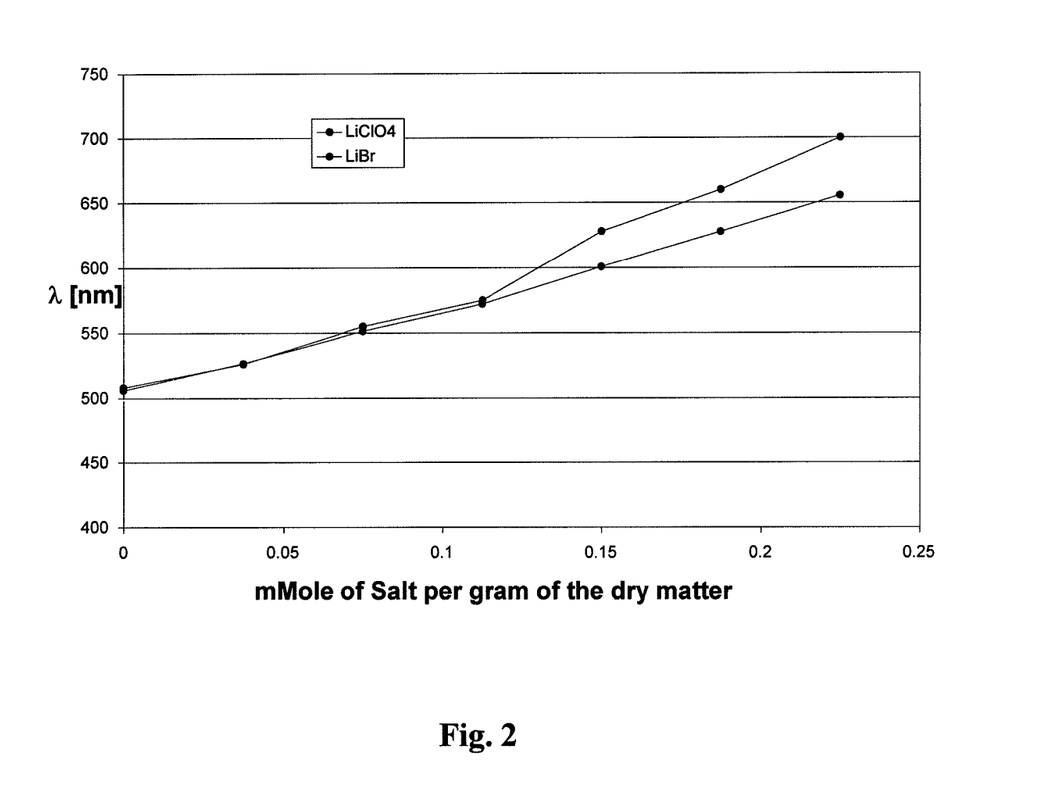
FIG. 2 is a diagram showing the position of the selective reflection band ($\lambda_{max}$) of a cured chiral liquid crystal precursor composition suitable for use in the present invention as a function of the millimoles of salt per gram of dry matter.

Two different salts, i.e., $LiClO_4$ and LiBr, were added to the above chiral liquid crystal precursor composition (I). FIG. 2 illustrates the effect of the molar concentration of salt per gram of dry matter on the wavelength of the maximum normal reflection of the cured composition. As can be seen from FIG. 2, both $LiClO_4$ and LiBr have a strong effect on the position of the normal reflection band.

Preparation of Cured Chiral Liquid Crystal Precursor Compositions (1) Preparation of Salt-Containing Compositions The above composition (I) was modified by adding thereto two different salts, i.e., $LiClO_4$ and LiBr, in the following weight percentages (based on the total weight of the solvent containing composition, the percentage of solvent shown above being correspondingly reduced by the percentage of added salt):

Composition (Ia): 0.66% $LiClO_4$
Composition (Ib): 0.55% LiBr.

The above percentages reflect the different molecular weights of the salts and result in approximately the same mole percentage of each salt in compositions (Ia) and (Ib).

(2) General Procedure for Making Marking:

On one side of a substrate (transparent PET film, thickness 125 μm) an about 10 μm thick layer of one of the liquid crystal precursor compositions set forth above is applied over the entire surface of the substrate using a hand coater. The coated sample is then rapidly placed on the heating plate (80° C.) to evaporate the solvent and develop the cholesteric liquid crystal phase.

After about 30 seconds of heating the solvent is evaporated and the liquid crystal precursor composition is cured using a UV lamp (mercury low-pressure lamp having a UV irradiance of 10 mW/cm²) for about 1 second. The thickness of the thus cured cholesteric LC polymer layer is about 3.3 μm.

The above Examples demonstrate that the addition of salt to a chiral liquid crystal precursor composition can be used to shift the position of the selective reflection band of the corresponding cured polymer in a controllable manner and that both the type of salt and the concentration thereof can influence the shifting effect of a salt (in addition to the changing of the concentration of the chiral dopant).

The following compounds may, for example, be employed in the above Examples as chiral dopant compound B of formula (I):

(3R,3aR,6R,6aR)-hexahydrofuro[3,2-b]furan-3,6-diyl bis(4-(4-(acryloyloxy)-3-methoxybenzoyloxy)-3-methoxybenzoate);

(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxybenzoate;

(3R,3aR,6R,6aR)-hexahydrofuro[3,2-b]furan-3,6-diyl bis(4-(4(acryloyloxy)benzoyloxy)-benzoate);

(3R,3aR,6R,6aR)-hexahydrofuro[3,2-b]furan-3,6-diyl bis(4-(4-(acryloyloxy)butoxy)-benzoate);

(3R,3aR,6R,6aR)-hexahydrofuro[3,2-b]furan-3,6-diyl bis(4-(acryloyloxy)-2-methyl-benzoate);

(3R,3aR,6S,6aR)-hexahydrofuro[3,2-b]furan-3,6-diyl bis(4-(4-(acryloyloxy)benzoyloxy)-3-methoxybenzoate);

(3R,3aR,6R,6aR)-hexahydrofuro[3,2-b]furan-3,6-diyl bis(4-(4-(acryloyloxy)-3-methoxy-benzoyloxy)benzoate);

(3R,3aR,6R,6aR)-hexahydrofuro[3,2-b]furan-3,6-diyl bis(4-(4(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methoxybenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;

2,5-bis-O-(4-{[4-(acryloyloxy)-2,5-dimethylbenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-ethoxybenzoyl)-1,4:3,6-dianhydro-D-mannitol;

2,5-bis-O-(4-{[4-(acryloyloxy)-2-methoxybenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-methoxybenzoyl)-1,4:3,6-dianhydro-D-mannitol;

2,5-bis-O-(4-{[4-(acryloyloxy)-2-ethoxybenzoyl]oxy}-3-methylbenzoyl)-1,4:3,6-dianhydro-D-mannitol;

2,5-bis-O-(4-{[4-(acryloyloxy)-2-ethoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;

2,5-bis-O-(4-{[4-(acryloyloxy)benzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol;

2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

As nematic compound A1 in the above Examples the following compounds may, for example, be employed:

benzoic acid, 4-[[[4-[(1-oxo-2-propen-1-yl)oxy]butoxy]carbonyl]oxy]-1,1'-(2-methyl-1,4-phenylene)ester;

2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;

2-methoxybenzene-1,4-diyl bis[4-({[4-(acryloyloxy)butoxy]carbonyl}oxy)-2-methyl-benzoate];

2-methylbenzene-1,4-diyl bis[4-({[4-(acryloyloxy)butoxy]carbonyl}oxy)-2-methyl-benzoate];

4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;

2-methylbenzene-1,4-diyl bis[4-({[4-(acryloyloxy)butoxy]carbonyl}oxy)benzoate];

2-methylbenzene-1,4-diyl bis[4-({[4-(acryloyloxy)butoxy]carbonyl}oxy)-3-methoxy-benzoate];

4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxy-benzoate];

2-methoxybenzene-1,4-diyl bis[4-({[4-(acryloyloxy)butoxy]carbonyl}oxy)-3,5-di-methoxybenzoate]; and 4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate.

As nematic compound A2 in the above Examples the following compounds may, for example, be employed:

2-methyl-1,4-phenylene bis(4-(4-(acryloyloxy)butoxy)-benzoate);

4-({4-[4-(acryloyloxy)butoxy]benzoyl}oxy)-3-methylphenyl 4-[4-(acryloyloxy)butoxy]-2-methylbenzoate;

4-({4-[4-(acryloyloxy)butoxy]benzoyl}oxy)-3-methylphenyl 4-[4-(acryloyloxy)butoxy]-3-methylbenzoate;

2-methylbenzene-1,4-diyl bis{4-[4-(acryloyloxy)butoxy]-2-methylbenzoate};

4-({4-[4-(acryloyloxy)butoxy]-2-methylbenzoyl}oxy)-3-methylphenyl 4-[4-(acryloyl-oxy)butoxy]-2,5-dimethylbenzoate;

2-methylbenzene-1,4-diyl bis{4-[4-(acryloyloxy)butoxy]-2,5-dimethylbenzoate};

2-methylbenzene-1,4-diyl bis{4-[4-(acryloyloxy)butoxy]benzoate};

4-({4-[4-(acryloyloxy)butoxy]-3,5-dimethylbenzoyl}oxy)-3-methylphenyl 4-[4-(acryloyloxy)butoxy]-2,5-dimethylbenzoate;

2-methylbenzene-1,4-diyl bis{4-[4-(acryloyloxy)butoxy]-3,5-dimethylbenzoate};

2-methoxybenzene-1,4-diyl bis{4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyl-oxy)butoxy]-3,5-dimethylbenzoate;

2-methoxybenzene-1,4-diyl bis{4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis{4-[4-(acryloyloxy)butoxy]-2-methoxybenzoate};

2-methoxybenzene-1,4-diyl bis{4-[4-(acryloyloxy)butoxy]-3,5-dimethoxybenzoate};

2-methoxybenzene-1,4-diyl bis{4-[4-(acryloyloxy)butoxy]-3-methoxybenzoate};

2-ethoxybenzene-1,4-diyl bis{4-[4-(acryloyloxy)butoxy]benzoate};

2-ethoxybenzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]-2,5-dimethyl-benzoate};

2-(propan-2-yloxy)benzene-1,4-diyl bis{4-[4-(acryloyloxy)butoxy]-3,5-dimethyl-benzoate}; and 2-(propan-2-yloxy)benzene-1,4-diyl bis{4-[4-(acryloyloxy)butoxy]-3,5-dimethoxy-benzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosure of concurrently filed U.S. application Ser. No. 13/313,238, filed Dec. 7, 2011, entitled "Composite Marking Based on Chiral Liquid Crystal Precursors" is incorporated by reference herein.

What is claimed is:

1. A chiral liquid crystal precursor composition, the chiral liquid crystal precursor composition comprising (i) one or more nematic compounds A and (ii) one or more chiral dopant compounds B which are capable of giving rise to a cholesteric state of the chiral liquid crystal precursor composition, the chiral liquid crystal precursor composition being in a form of a spray coating composition, a knife coating composition, a roller coating composition, a screen coating composition, a curtain coating composition, a gravure printing composition, a flexography composition, an offset printing composition, a dry offset printing composition a letterpress printing composition, a screen-printing composition, or a pad printing composition, and comprising at least one salt in an amount effective to change a position of a selective reflection band exhibited by the composition in a cured state compared to a position of a selective reflection band exhibited by a composition in a cured state that does not contain the at least one salt.

2. The precursor composition of claim 1, wherein the chiral liquid crystal precursor composition comprises at least two nematic compounds A.

3. The precursor composition of claim 1, wherein the one or more nematic compounds A as well as the one or more chiral dopant compounds B comprise at least one compound that comprises at least one polymerizable group.

4. The precursor composition of claim 3, wherein the at least one polymerizable group comprises an unsaturated carbon-carbon bond.

5. The precursor composition of claim 4, wherein the at least one polymerizable group comprises a group of formula $H_2C=CH—C(O)—$.

6. The precursor composition of claim 1, wherein all of the one or more nematic compounds A and all of the one or more chiral dopant compounds B comprise at least one polymerizable group.

7. The precursor composition of claim 1, wherein the at least one chiral dopant compound B comprises at least one chiral dopant compound B of formula (I):

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (I) to (iii):

$$—[(CH_2)_y—O]_z—C(O)—CH=CH_2; \quad (i)$$

$$—C(O)\text{-}D_1\text{-}O—[(CH_2)_y—O]_z—C(O)—CH=CH_2; \quad (ii)$$

$$—C(O)\text{-}D_2\text{-}O—[(CH_2)_y—O]—C(O)—CH=CH_2; \quad (iii)$$

$D_1$ denotes a group of formula $D_2$ denotes a group of formula m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

8. The precursor composition of claim 1, wherein the at least one salt is selected from metal salts and ammonium salts.

9. The precursor composition of claim 8, wherein the at least one salt comprises at least one of lithium perchlorate, lithium nitrate, lithium tetrafluoroborate, lithium bromide, lithium chloride, tetrabutylammonium perchlorate, tetrabutylammonium chloride, tetrabutylammonium tetrafluoroborate, tetrabutylammonium bromide, sodium carbonate, sodium chloride, and sodium nitrate.

10. The precursor composition of claim 8, wherein the at least one salt comprises a metal salt.

11. The precursor composition of claim 10, wherein the metal is selected from alkali and alkaline earth metals.

12. The precursor composition of claim 11, wherein the metal is selected from Li and Na.

13. The precursor composition of claim 12, wherein the metal is Li.

14. The precursor composition of claim 1, wherein the at least one salt is present at a concentration that results in a shift of a position of the selective reflection band exhibited by the precursor composition in the cured state by at least about 5 nm compared to a position of the selective reflection band exhibited by the precursor composition in the cured state without the at least one salt.

15. The precursor composition of claim 1, wherein the at least one salt is present in the precursor composition at a concentration of from about 0.01% to about 10% by weight, based on a solids content of the precursor composition.

16. The precursor composition of claim 1, wherein the at least one salt shifts a position of the selective reflection band exhibited by the composition in the cured state to longer wavelengths.

17. The precursor composition of claim 1, wherein the at least one salt shifts a position of the selective reflection band exhibited by the composition in the cured state to shorter wavelengths.

18. The precursor composition of claim 1, wherein at least a part of the selective reflection band exhibited by the precursor composition in the cured state that has been shifted by the at least one salt is in the visible range.

19. The precursor composition of claim 1, wherein the composition further comprises at least one polymerization initiator.

20. The precursor composition of claim 19, wherein the at least one polymerization initiator comprises a UV polymerization initiator.

21. The precursor composition of claim 1, wherein the composition is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

22. The precursor composition of claim 21, wherein the precursor composition is in the cured chiral liquid crystal state.

23. A substrate which comprises at least one precursor composition according to claim 1.

24. The substrate of claim 23, wherein the substrate is or comprises at least one of a label, packaging, a cartridge, a container that contains nutraceuticals, pharmaceuticals, foodstuffs or beverages, a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

25. A method of changing a position of a selective reflection band exhibited by a chiral liquid crystal precursor composition in a cured state, wherein the method comprises incorporating in the precursor composition at least one salt that is capable of changing a position of a selective reflection band exhibited by the precursor composition in a cured state, and the precursor composition is in a form of a spray coating composition, a knife coating composition, a roller coating composition, a screen coating composition, a curtain coating composition, a gravure printing composition, a flexography composition, an offset printing composition, a dry offset printing composition a letterpress printing composition, a screen-printing composition, or a pad printing composition.

26. A method of shifting a selective reflection band exhibited by a chiral liquid crystal precursor composition in a cured state to a predetermined position, wherein the method comprises incorporating in the precursor composition at least one salt in an amount that results in a shift of the selective reflection band to the predetermined position, and the precursor composition is in a form of a spray coating composition, a knife coating composition, a roller coating composition, a screen coating composition, a curtain coating composition, a gravure printing composition, a flexography composition, an offset printing composition, a dry offset printing composition a letterpress printing composition, a screen-printing composition, or a pad printing composition.

27. The method of claim 26, wherein the method further comprises determining a shift of the position of the selective reflection band as a function of an amount of the least one salt present in the precursor composition and selecting an amount that results in a shift of the selective reflection band to the predetermined position.

28. The method of claim 26, wherein a position of the selective reflection band is shifted to a predetermined wavelength.

29. A chiral liquid crystal precursor composition with a predetermined shift of a selective reflection band exhibited by the precursor composition in a cured state, obtained by the method of claim 26.

30. The precursor composition of claim 29, wherein the composition is in a cured state.

31. A method of providing a marking on a substrate, wherein the method comprises:
    a) applying by at least one of spray coating, knife coating, roller coating, screen coating, curtain coating, gravure printing, flexography, offset printing, dry offset printing, letterpress printing, screen-printing, or pad printing onto a surface of the substrate a precursor composition of claim 1,
    b) heating the applied composition to bring same to a chiral liquid crystal state; and
    c) curing the composition in the chiral liquid crystal state.

32. The method of claim 31, wherein (b) comprises heating the composition to a temperature in a range of from about 55° C. to about 150° C.

33. The method of claim 31, wherein (c) comprises applying UV radiation.

34. The method of claim 31, wherein the composition is applied in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

35. The method of claim 31, wherein the substrate is or comprises at least one of a label, packaging, a cartridge, a container that contains nutraceuticals, pharmaceuticals, foodstuffs or beverages, a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

36. The method of claim 31, wherein at least two different precursor compositions are applied onto the substrate and are processed according to (b) and (c) either together or separately.

37. The method of claim 36, wherein the precursor compositions differ with respect to the at least one salt comprised therein.

38. The method of claim 36, wherein the precursor compositions differ with respect to concentrations of the at least one salt comprised therein.

39. A substrate provided with a marking, wherein the marking is produced by the method of claim 31.

40. A substrate which comprises at least two precursor compositions according to claim 1, wherein the precursor compositions differ with respect to at least one of (i) concentrations of the at least one salt and (ii) the at least one salt.

41. A chiral liquid crystal precursor composition, the liquid crystal precursor composition comprising (i) one or more nematic compounds A and (ii) one or more chiral dopant compounds B which are capable of giving rise to a cholesteric state of the chiral liquid crystal precursor composition, and at least one salt in an amount effective to change a position of a selective reflection band exhibited by the composition in a cured state to a predetermined wavelength as compared to a position of a selective reflection band exhibited by a composition in a cured state that does not contain the at least one salt.

42. The precursor composition of claim 41, further comprising at least one conductivity agent and the at least one salt is present in an amount effective to change a position of a selective reflection band exhibited by the composition in a cured state to a predetermined wavelength as compared to a position of a selective reflection band exhibited by a composition containing the conductivity agent in a cured state that does not contain the at least one salt.

43. A method of providing a marking on a substrate, wherein the method comprises:
   a) applying onto a surface of the substrate a precursor composition of claim 41,
   b) heating the applied composition to bring same to a chiral liquid crystal state; and
   c) curing the composition in the chiral liquid crystal state.

44. A marking on a substrate produced by the method according to claim 43.

* * * * *